United States Patent
Haruki et al.

(10) Patent No.: US 11,724,810 B2
(45) Date of Patent: Aug. 15, 2023

(54) OUTER PANEL-MEDIATED COOLING SYSTEM

(71) Applicant: Kawasaki Jukogyo Kabushiki Kaisha, Kobe (JP)

(72) Inventors: Yu Haruki, Kobe (JP); Keiji Sakagawa, Kobe (JP); Kazuhide Hakamada, Kobe (JP); Ryosuke Mitani, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 128 days.

(21) Appl. No.: 17/418,254

(22) PCT Filed: Dec. 24, 2019

(86) PCT No.: PCT/JP2019/050594
§ 371 (c)(1),
(2) Date: Jun. 25, 2021

(87) PCT Pub. No.: WO2020/138076
PCT Pub. Date: Jul. 2, 2020

(65) Prior Publication Data
US 2022/0063817 A1    Mar. 3, 2022

(30) Foreign Application Priority Data
Dec. 27, 2018    (JP) .................. 2018-245269

(51) Int. Cl.
*B64D 13/00*    (2006.01)
(52) U.S. Cl.
CPC ............... *B64D 13/006* (2013.01)

(58) Field of Classification Search
CPC .............. B64D 13/006; B64D 13/08; B64D 2013/0614; B64D 2013/0674; Y02T 50/50
See application file for complete search history.

(56) References Cited

U.S. PATENT DOCUMENTS

| | | | |
|---|---|---|---|
| 4,819,720 A * | 4/1989 | Howard ................. | B64D 13/00 165/104.34 |
| 4,969,509 A | 11/1990 | Merensky | |
| 10,011,362 B2 * | 7/2018 | Piesker ..................... | F28F 1/02 |
| 2011/0186263 A1 * | 8/2011 | Piesker .................. | B64D 13/06 165/47 |

FOREIGN PATENT DOCUMENTS

JP        1-311999 A    12/1989

* cited by examiner

*Primary Examiner* — Emmanuel E Duke
(74) *Attorney, Agent, or Firm* — Xsensus LLP

(57) ABSTRACT

An outer panel-mediated cooling system includes: an outer shell including an outer panel, an inner panel located inward of the outer panel, and a heat-insulating layer located between the outer and inner panels; a cooling chamber that is located between the outer and inner panels and in which a gas releases heat outside through the outer panel and is thus cooled; a circulation loop in which a heat medium circulates, the circulation loop including a heating section located inward of the inner panel to heat the heat medium and a cooling section located in the cooling chamber to cool the heat medium; a flow path-forming structure located in the cooling chamber to form a circulation path for the gas; and a fan located in the cooling chamber to exert a drive force on the gas to allow the gas to circulate in the circulation path.

5 Claims, 6 Drawing Sheets

OUTER PANEL-MEDIATED COOLING SYSTEM

CROSS-REFERENCE TO RELATED APPLICATIONS

This application is based on PCT filing PCT/JP2019/050594, filed Dec. 24, 2019, which claims priority to JP 2018-245269, filed on Dec. 27, 2018, the entire disclosure of each are incorporated herein by reference.

TECHNICAL FIELD

The present invention relates to an outer panel-mediated cooling system using a cooled gas resulting from heat exchange with an external fluid via an outer panel.

BACKGROUND ART

In recent years, transportation machines have been increasingly electrified, and electronic devices have become more and more sophisticated and miniaturized. This has led to a growing demand for thermal management in transportation machines such as watercrafts, railcars, automobiles, and aircrafts which are equipped with a large number of the sophisticated, miniaturized devices. Aircrafts, which are an example of the transportation machines, have traditionally incorporated a heat sink to cool the electronic devices. The heat sink makes use of high-altitude cool air taken in through an air scoop located on the aircraft body surface. The use of such a heat sink has posed problems such as increased air resistance due to discontinuity of the aircraft body surface and entry of foreign matter into the air scoop. To address these problems, outer panel-mediated heat exchangers have been proposed which are adapted to effect heat exchange between high-altitude cool air and interior-circulating air. Patent Literatures 1 and 2 each disclose an outer panel-mediated heat exchanger installed in an aircraft.

The aircraft-installed outer panel-mediated heat exchanger of Patent Literature 1 includes a cool air chamber having a wall constituted in part by an outer panel and a cooling room communicating with the cool air chamber via inlet and outlet ducts. Air flowing into the cool air chamber from the cooling room through the outlet duct exchanges heat with atmospheric air via the outer panel and is thus cooled. The cooled air flows into the cooling room through the inlet duct and cools foods and drinks stored in the cooling room.

The aircraft-installed outer panel-mediated heat exchanger of Patent Literature 2 includes a closed loop made up of an envelope formed between outer and inner panels, a compartment enclosing aircraft electronic devices, and exhaust and collector ducts connecting the compartment and envelope. Air whose temperature has been increased by heat released from the aircraft electronic devices in the compartment flows into the envelope through the exhaust duct and becomes cool by exchanging heat with outside air via the outer panel during passage through the envelope. The cooled air returns to the compartment through the collector duct and cools the aircraft electronic devices.

CITATION LIST

Patent Literature

PTL 1: Japanese Laid-Open Patent Application Publication No. H01-311999
PTL 2: U.S. Pat. No. 4,819,720

SUMMARY OF INVENTION

Technical Problem

In the above outer panel-mediated heat exchanger of Patent Literature 1, a gas cooled in the cool air chamber is circulated to the cooling room located in the interior of the aircraft. Likewise, in the above outer panel-mediated heat exchanger of Patent Literature 2, a gas cooled in the envelope is circulated to the compartment located in the interior of the aircraft.

When the gas cooled by the outer panel-mediated heat exchanger is circulated in the interior of the aircraft in the above manner, there is a need for a filter for removing dust entrained by the gas flowing in the interior of the aircraft and devices for regulating the humidity and pressure of the gas. This leads to size increase of the system and complication of the system maintenance. Additionally, the fluid circulated in the interior of the aircraft is limited to a gas (in particular, air), and thus the variety of choices for the cooling target is narrow.

The present invention has been made in view of the above circumstances, and an object of the present invention is to provide a transportation machine-installed outer panel-mediated cooling system that uses a cooled gas resulting from heat exchange with an external fluid via an outer panel, the system being adapted to increase the variety of choices for the cooling target.

Solution to Problem

An outer panel-mediated cooling system according to an aspect of the present invention is for use in a transportation machine and includes: an outer shell including an outer panel, an inner panel located inward of the outer panel, and a heat-insulating layer located between the outer and inner panels; a cooling chamber that is located between the outer and inner panels and in which a gas releases heat outside through the outer panel and is thus cooled; a circulation loop in which a heat medium circulates, the circulation loop including a heating section located inward of the inner panel to heat the heat medium and a cooling section located in the cooling chamber to cool the heat medium; a flow path-forming structure located in the cooling chamber to form a circulation path for the gas; and a fan located in the cooling chamber to exert a drive force on the gas to allow the gas to circulate in the circulation path.

In the outer panel-mediated cooling system configured as described above, the gas cooled through heat exchange with outside air via the outer panel (this gas will hereinafter be referred to as "cooled gas") does not circulate in the interior of the transportation machine, but the heat medium circulating in the interior of the transportation machine is cooled by the cooled gas. Since the cooled gas indirectly cools the heat medium passing through the cooling section, the cooled gas and the heat medium are not mixed. This permits any gas or liquid to be used as the heat medium. The fact that any heat medium can be used increases the variety of choices for the cooling target that provides heat to the heat medium flowing in the heating section.

Advantageous Effects of Invention

The present invention can provide an outer panel-mediated cooling system of a transportation machine that uses a cooled gas resulting from heat exchange with an external fluid via an outer panel, the system being adapted to increase the variety of choices for the cooling target.

DESCRIPTION OF EMBODIMENTS

Hereinafter, an exemplary embodiment of the present invention will be described with reference to the drawings. An outer panel-mediated cooling system 1 according to the exemplary embodiment is applicable to transportation machines such as watercrafts (including submersibles), railcars, automobiles, and aircrafts, and used to cool a cooling target 99 located in a transportation machine. The following describes an example where the outer panel-mediated cooling system 1 is applied to an aircraft 10 which is an example of the transportation machine.

Figure 1:
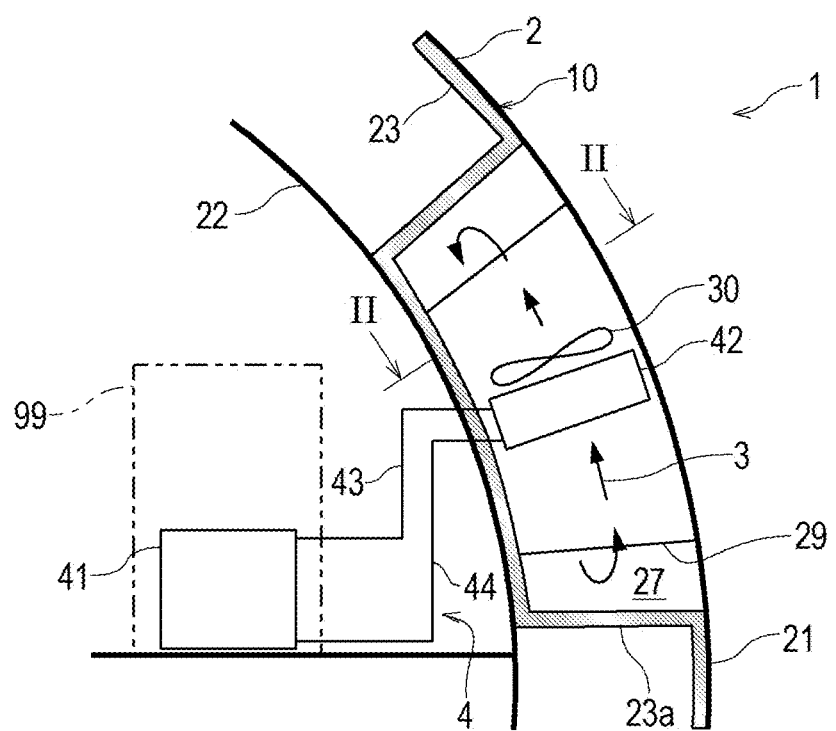
FIG. 1 illustrates a schematic configuration of an outer panel-mediated cooling system according to an exemplary embodiment of the present invention.
Figure 2:
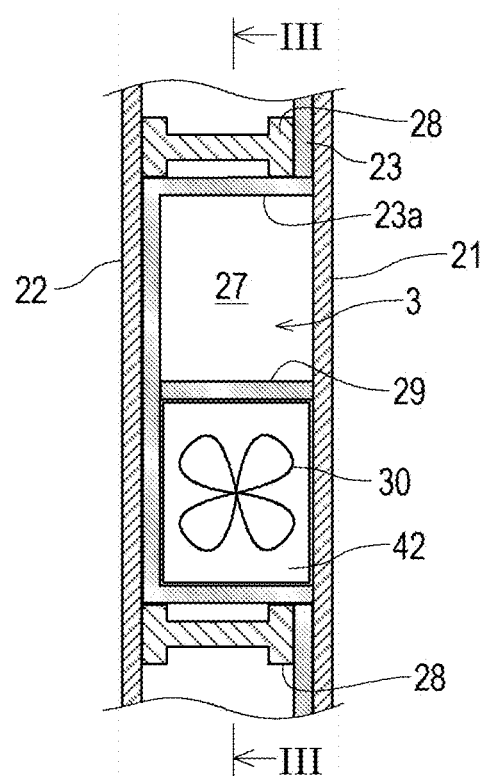
FIG. 2 is a cross-sectional view taken along the arrow II-II of FIG. 1.
Figure 3:
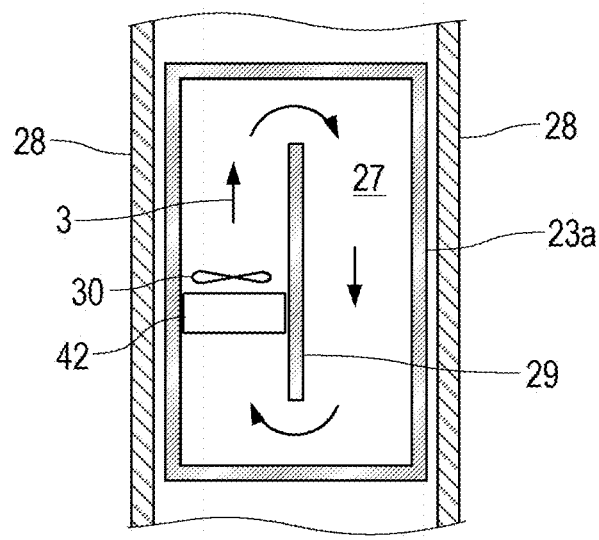
FIG. 3 is a cross-sectional view taken along the arrow III-III of FIG. 2.

FIG. 1 illustrates a schematic configuration of the outer panel-mediated cooling system 1 according to the exemplary embodiment of the present invention, FIG. 2 is a cross-sectional view taken along the arrow II-II of FIG. 1, and FIG. 3 is a cross-sectional view taken along the arrow III-III of FIG. 2. Shown in FIG. 1 is a cross-section of a part of the fuselage of the aircraft 10 which is an example of the transportation machine to which the outer panel-mediated cooling system 1 is applied.

The aircraft 10 of FIG. 1 includes an outer shell 2. The outer shell 2 includes an outer panel 21, an inner panel 22 spaced inward from the outer panel 21, and a heat-insulating layer 23 located between the outer and inner panels 21 and 22. The outer panel 21 is made of, for example, an aluminum alloy or a carbon fiber-reinforced plastic (CFRP). The inner panel 22 forms a wall separating the interior and exterior of the aircraft body. Inward of the inner panel 22 there are, for example, a cockpit, a cabin, a cargo compartment, an electronic equipment compartment accommodating aircraft electronic devices, and a mechanical equipment compartment accommodating machinery including the engine (all of these are not shown).

The heat-insulating layer 23 thermally insulates the outer and inner panels 21 and 22. The heat-insulating layer 23 may be in the form of, for example, a vacuum insulator. In an example, the vacuum insulator is made up of a porous, thermally insulating core formed in a desired shape and a laminated film covering the core, and the interior of the laminated film is depressurized to a substantially perfect vacuum.

In the aircraft 10 configured as described above, the outer panel-mediated cooling system 1 is constructed which uses a cooled gas resulting from heat exchange with an external fluid via the outer panel 21. The outer panel-mediated cooling system 1 includes: the outer shell 2 described above; a cooling chamber 27 that is located between the outer and inner panels 21 and 22 and in which a gas releases heat outside through the outer panel 21 and is thus cooled; a circulation loop 4 in which a heat medium circulates; a flow path-forming structure 29 located in the cooling chamber 27; and a fan 30 located in the cooling chamber 27. The circulation loop 4 includes a heating section 41 located inward of the inner panel 22 to heat the heat medium and a cooling section 42 located in the cooling chamber 27 to cool the heat medium.

Figure 4:
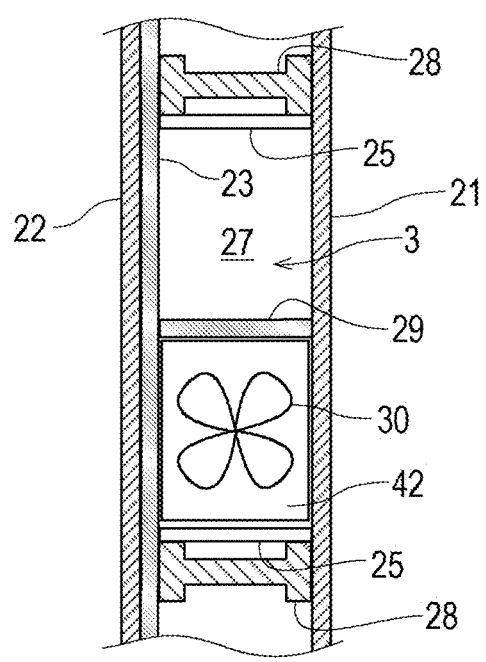
FIG. 4 illustrates a variant of the cooling chamber of FIG. 1.

The cooling chamber 27 located between the outer and inner panels 21 and 22 is formed by the outer panel 21 and a part (heat-insulating layer 23a) of the heat-insulating layer 23. As shown in FIGS. 1 and 2, adjacent frames 28 are located between the outer and inner panels 21 and 22, and the heat-insulating layer 23a extends along one of the adjacent frames 28, the inner panel 22, and the other frame 28. The cooling chamber 27 includes the heat-insulating layer 23a and a part of the outer panel 21 and is box-shaped as a whole. It should be noted that, as shown in FIG. 4, metal plates 25 that block gas migration but permit heat transfer may be placed along the frames 28 instead of the heat-insulating layer 23. Through the metal plates 25, the gas in the cooling chamber 27 releases heat also to a gas present between the outer and inner panels 21 and 22 and outside the cooling chamber 27. In this case, the gas present between the outer and inner panels 21 and 22 and outside the cooling chamber 27 may exchange heat with outside air via the outer panel 21.

The interior of the cooling chamber 27 is a hermetically sealed space and charged with a gas dry enough not to cause dew formation during high-altitude flight. The outer panel 21 is exposed to high-altitude outside air (external fluid) during flight of the aircraft 10. The outside air and the gas in the cooling chamber 27 exchange heat via the outer panel 21, and thus the gas in the cooling chamber 27 is cooled.

In the cooling chamber 27, an annular circulation path 3 is formed by the flow path-forming structure 29. The flow path-forming structure 29 of FIGS. 1 and 2 is a plate structure substantially orthogonal to at least one of the outer and inner panels 21 and 22 and having an aircraft interior-side edge joined to the heat-insulating layer 23a and an aircraft exterior-side edge joined to the outer panel 21. The upper and lower surfaces of the flow path-forming structure 29 are spaced from the heat-insulating layer 23a, and the gas passes through the gaps between the heat-insulating layer 23a and the upper and lower surfaces of the flow path-forming structure 29. The flow path-forming structure 29 may, like the heat-insulating layer 23, be in the form of a vacuum insulator.

The flow path-forming structure 29 located in the cooling chamber 27 forms the circulation path 3 for the cooled gas. As shown in FIG. 3, the cooled gas flows upward in the aircraft front-side region of the circulation path 3 and downward in the aircraft rear-side region of the circulation path 3. Alternatively, the circulation path 3 for the cooled gas may be formed by the flow path-forming structure 29 in such a manner that the cooled gas flows downward in the aircraft front-side region of the circulation path 3 and upward in the aircraft rear-side region of the circulation path 3.

At least one cooling section 42 and at least one fan 30 are located in the aircraft front-side region of the cooling chamber 27 that is anterior to the flow path-forming structure 29. The fan 30 exerts a drive force on the cooled gas present in the cooling chamber 27 to allow the cooled gas to circulate in the circulation path 3.

The circulation loop 4 includes the heating section 41 located inward of the inner panel 22, the cooling section 42 located in the cooling chamber 27, a high-temperature line 43 that delivers the heat medium from the heating section 41 to the cooling section 42, and a low-temperature line 44 that delivers the heat medium from the cooling section 42 to the heating section 41, and the heat medium circulates in the circulation loop 4.

The heating section 41 is the part of the circulation loop 4 that is adapted to heat the heat medium. The heating section 41 is thermally connected to the cooling target 99 located inside the body of the aircraft 10. The state in which the heating section 41 and cooling target 99 are thermally connected refers to a state in which, for example, the heating section 41 is in contact with or located in the cooling target 99 to enable heat transfer from the cooling target 99 to the heat medium flowing in the heating section 41. The heat medium flowing in the heating section 41 absorbs heat from the cooling target 99, with the result that the temperature of the heat medium is increased while the cooling target 99 is cooled. The high-temperature line 43 includes a conduit connecting the outlet of the heating section 41 and the inlet of the cooling section 42. The heat medium whose temperature has been increased in the heating section 41 reaches the inlet of the cooling section 42 through the high-temperature line 43.

The cooling section 42 is the part of the circulation loop 4 that is adapted to cool the heat medium. The cooling section 42 is placed in a region of the circulation path 3 in such a manner as to cover the flow path cross-section of the region. For example, the cooling section 42 includes a large number of heat transfer tubes and inlet-side and outlet-side headers for holding the heat transfer tubes together (the tubes and headers are not shown). When flowing in the cooling section 42 located in the circulation path 3 of the cooling chamber 27, the heat medium releases heat to the cooled gas flowing in the circulation path 3, and thus the heat medium is cooled.

The low-temperature line 44 includes a conduit connecting the outlet of the cooling section 42 and the inlet of the heating section 41. The heat medium cooled in the cooling section 42 flows into the heating section 41 through the low-temperature line 44 and is used again to cool the cooling target 99.

In the heat medium circulation loop 4 configured as described above, the cooling target 99 may be at least one of: an electronic device including heat-generating parts, such as a control board, an engine control unit (ECU), or a computer; a friction heat-generating mechanical part such as a bearing; a battery; and interior air. When the cooling target 99 is a friction heat-generating mechanical part such as a bearing, the heat medium could be heated not only by receiving thermal energy from the high-temperature mechanical part but also by receiving kinetic energy as a result of, for example, being compressed between mechanical parts. Thus, the heating section 41 may be such that the heat medium receives thermal energy from the cooling target 99 and is heated or that the heat medium receives kinetic energy or any other kind of energy and is heated.

Figure 5:
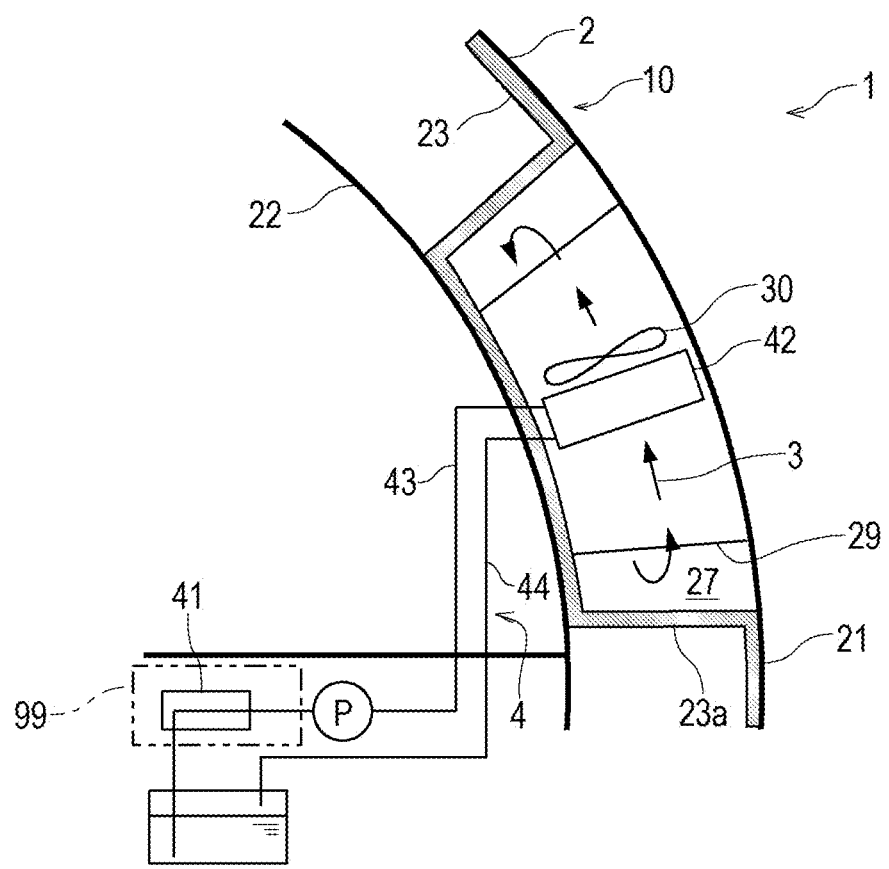
FIG. 5 illustrates a variant of a heat medium circulation loop.

The heat medium may be any liquid or gas. Examples of the heat medium include water, an alcohol, ammonia, a liquid mixture of these substances, and an oil. The heat medium circulation loop 4 may be in the form of at least one of a vapor cycle system, a heat pipe, and an immersion cooling system. As shown in FIG. 5, the heat medium circulation loop 4 may be provided with a pump P that forces the heat medium to circulate in the heat medium circulation loop 4.

As described above, the outer panel-mediated cooling system 1 of a transportation machine according to the exemplary embodiment includes: an outer shell 2 including an outer panel 21, an inner panel 22 located inward of the outer panel 21, and a heat-insulating layer 23 located between the outer and inner panels 21 and 22; a cooling chamber 27 that is located between the outer and inner panels 21 and 22 and in which a gas releases heat outside through the outer panel 21 and is thus cooled; a circulation loop 4 in which a heat medium circulates, the circulation loop 4 including a heating section 41 located inward of the inner panel 22 to heat the heat medium and a cooling section 42 located in the cooling chamber 27 to cool the heat medium; a flow path-forming structure 29 located in the cooling chamber 27 to form a circulation path 3 for the gas; and a fan 30 located in the cooling chamber 27 to exert a drive force on the gas to allow the gas to circulate in the circulation path 3.

In the outer panel-mediated cooling system 1 configured as described above, the cooled gas resulting from heat exchange with outside air via the outer panel 21 does not circulate in the interior of the transportation machine, but the heat medium circulating in the interior of the transportation machine is cooled by the cooled gas. Since the cooled gas indirectly cools the heat medium passing through the cooling section 42, the cooled gas and the heat medium are not mixed. This permits any gas or liquid to be used as the heat medium. The fact that any heat medium can be used increases the variety of choices for the cooling target 99.

Additionally, in the above outer panel-mediated cooling system 1, the circulation path 3 for the gas is formed in the cooling chamber 27, and the cooled gas is forced by the fan 30 to circulate in the circulation path 3. Thus, heat release from the cooling section 42 located in the cooling chamber 27 can be promoted.

Further, in the above outer panel-mediated cooling system 1, the cooled gas in the cooling chamber 27 circulates in the cooling chamber 27, and outside air or any other gas present in the interior of the transportation machine is not introduced into the cooling chamber 27. This eliminates the need for a filter for removing dust from the cooled gas or a device for regulating the humidity or pressure of the cooled gas. Additionally, when the cooling chamber 27 is charged beforehand with a gas which is dry enough, dew formation in the cooling chamber 27 does no occur despite a decrease in temperature of outside air. This facilitates maintenance activities. Even when the gas in the cooling chamber 27 is not dry enough, a dry state can easily be established simply by placing an easily maintainable dehumidifier such as a desiccant dehumidifier in the cooling chamber 27.

In the above outer panel-mediated cooling system 1, as illustrated in the exemplary embodiment, the flow path-forming structure 29 may be in the form of a heat insulator.

In this case, the flow path-forming structure 29 can be formed integrally with the heat-insulating layer 23a defining the cooling chamber 27, and the number of required components can be reduced. Additionally, the flow path-forming structure 29 can thermally isolate forward and reverse flow regions of the circulation path 3 from each other.

Alternatively, in the outer panel-mediated cooling system 1, the cooling chamber 27 may be divided by a metal plate 25 from a space located between the outer and inner panels 21 and 22 and outside the cooling chamber 27.

In this case, heat is released to the space outside the cooling chamber 27 through the metal plate 25. Additionally, since the presence of the metal plate 25 increases the heat release area, the gas in the cooling chamber 27 can be cooled more effectively.

In the above outer panel-mediated cooling system 1, as illustrated in the exemplary embodiment, the flow path-forming structure 29 may be a plate structure orthogonal to at least one of the outer and inner panels 21 and 22.

In this case, the thermal distribution is relatively uniform between the regions located on opposite sides of the flow path-forming structure 29 in the cooling chamber 27, and heat can be efficiently released to the heat medium passing through the cooling section 42.

First Variant

Figure 6:
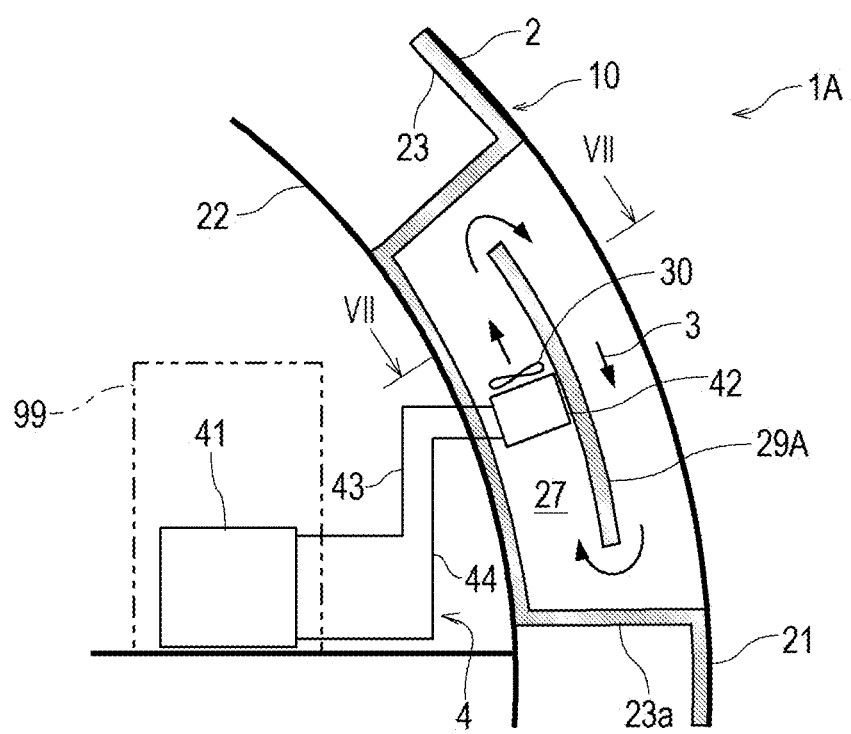
FIG. 6 illustrates a schematic configuration of an outer panel-mediated cooling system according to a first variant of the exemplary embodiment.
Figure 7:
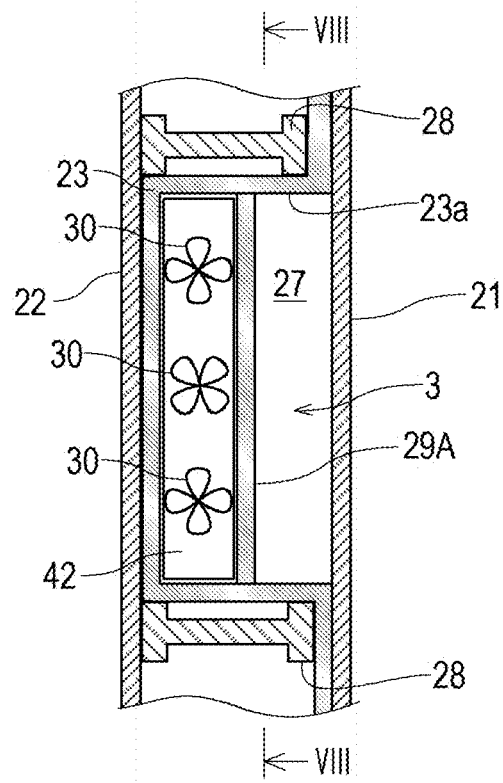
FIG. 7 is a cross-sectional view taken along the arrow VII-VII of FIG. 6.
Figure 8:
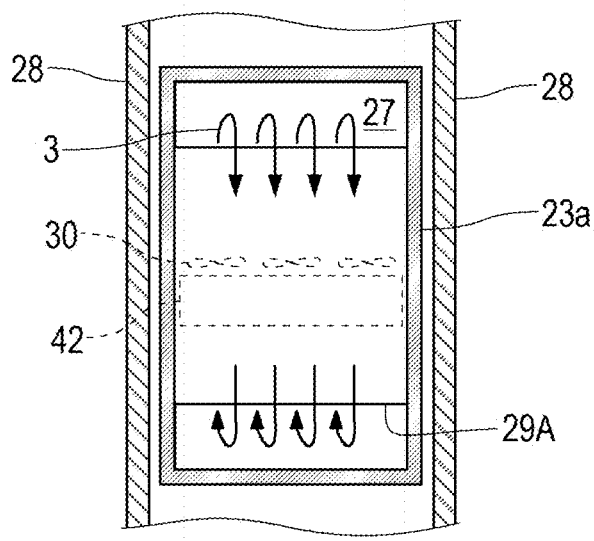
FIG. 8 is a cross-sectional view taken along the arrow VIII-VIII of FIG. 7.

Hereinafter, a first variant of the above embodiment will be described. FIG. 6 illustrates a schematic configuration of an outer panel-mediated cooling system 1A according to the first variant of the above embodiment, FIG. 7 is a cross-sectional view taken along the line VII-VII of FIG. 6, and FIG. 8 is a cross-sectional view taken along the arrow VIII-VIII of FIG. 7. For this variant, elements which are the same as or similar to those of the above embodiment are denoted by the same reference sings in the figures and will not be described below.

The difference of the outer panel-mediated cooling system 1A of FIGS. 6 to 8 from the outer panel-mediated cooling system 1 according to the above embodiment lies in a flow path-forming structure 29A located in the cooling chamber 27. Specifically, the flow path-forming structure 29A is a plate structure located between the outer and inner panels 21 and 22 and extending substantially parallel to at least one of the outer and inner panels 21 and 22. The upper and lower edges of the flow path-forming structure 29A are spaced from the heat-insulating layer 23a, and the gas passes through the gaps between the heat-insulating layer 23a and the upper and lower edges of the flow path-forming structure 29A.

The flow path-forming structure 29A located in the cooling chamber 27 forms the circulation path 3 for the cooled gas. The cooled gas flows upward in the aircraft interior-side region of the circulation path 3 and downward in the aircraft exterior-side region of the circulation path 3. At least one cooling section 42 and at least one fan 30 are located in the aircraft interior-side region of the cooling chamber 27 that is located inward of the flow path-forming structure 29A.

With such a flow path-forming structure 29A, the temperature distribution of the gas in the circulation path 3 is relatively uniform over the flow path cross-section, and variations in the degree of cooling in the cooling section 42 can be reduced.

Although the foregoing has described a preferred embodiment (and its variant) of the present invention, the scope of the present invention embraces modifications made to the details of the structure and/or function of the above embodiment without departing from the concept of the present invention.

The invention claimed is:

1. An outer panel-mediated cooling system for a transportation machine, comprising:
   an outer shell including an outer panel, an inner panel located inward of the outer panel, and a heat-insulating layer located between the outer and inner panels;
   a cooling chamber that is located between the outer and inner panels and in which a cooled gas releases heat outside through the outer panel and is thus cooled;
   a circulation loop in which a heat medium circulates, the circulation loop including a heating section located inward of the inner panel to heat the heat medium and a cooling section located in the cooling chamber to cool the heat medium;
   a flow path-forming structure located in the cooling chamber to form a circulation path for the cooled gas; and
   a fan located in the cooling chamber to exert a drive force on the cooled gas to allow the gas to circulate in the circulation path,
   wherein the cooled gas indirectly cools the heat medium passing through the cooling section, and the cooled gas and the heat medium are not mixed.

2. The outer panel-mediated cooling system according to claim 1, wherein the flow path-forming structure is in the form of a heat insulator.

3. The outer panel-mediated cooling system according to claim 1, wherein the cooling chamber is divided by a metal plate from a space located between the outer and inner panels and outside the cooling chamber.

4. The outer panel-mediated cooling system according to claim 1, wherein the flow path-forming structure is a plate structure extending parallel to at least one of the outer and inner panels.

5. The outer panel-mediated cooling system according to claim 1, wherein the flow path-forming structure is a plate structure orthogonal to at least one of the outer and inner panels.

\* \* \* \* \*